UNITED STATES PATENT OFFICE.

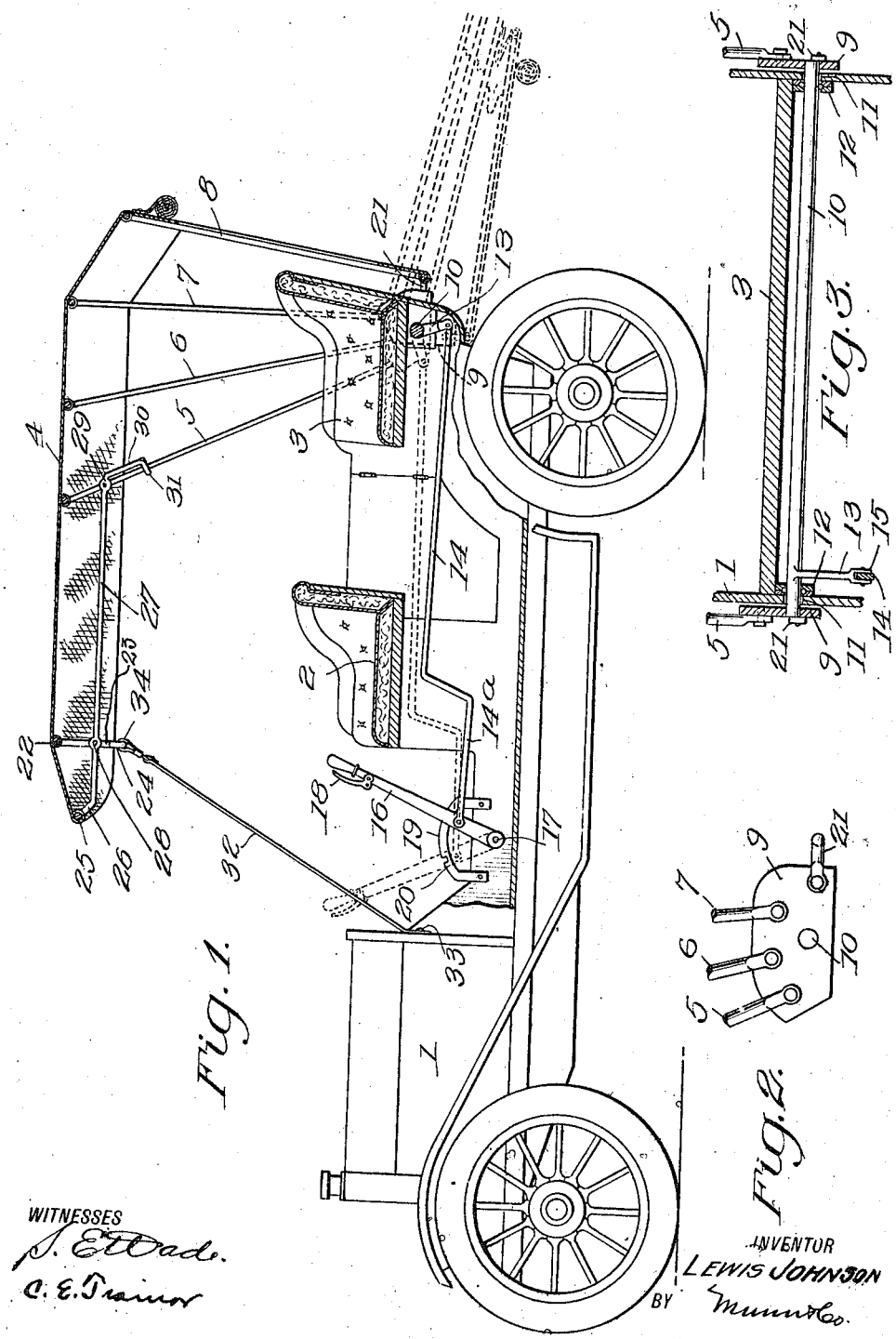

LEWIS JOHNSON, OF MONROE, LOUISIANA, ASSIGNOR OF THIRTY-FOUR ONE-HUNDREDTHS TO JOHN P. KENNEDY, THIRTY-THREE ONE-HUNDREDTHS TO WALTER S. LEYENS, AND THIRTY-THREE ONE-HUNDREDTHS TO CHARLES SCHULZE, ALL OF MONROE, LOUISIANA.

AUTOMOBILE TOP-LIFTER.

1,135,976.  Specification of Letters Patent.  Patented Apr. 13, 1915.

Application filed June 30, 1914. Serial No. 848,246.

*To all whom it may concern:*

Be it known that I, LEWIS JOHNSON, a citizen of the United States, and a resident of Monroe, in the parish of Ouachita and State of Louisiana, have made certain new and useful Improvements in Automobile Top-Lifters, of which the following is a specification.

My invention is an improvement in automobile top lifters, and has for its object to provide mechanism for use in connection with automobiles and like vehicles having extension tops, for permitting the top to be raised from one of the seats, without touching the top, and without the necessity of alighting from the vehicle.

In the drawings: Figure 1 is a side view of an automobile provided with the improvement with parts in section, Fig. 2 is a detail side view of a portion of the mechanism, and Fig. 3 is a transverse vertical section through the lifting mechanism.

The present embodiment of the invention is shown in connection with the body 1 of an automobile, having the usual front and rear seats 2 and 3, and the top 4 is supported by rear bows 5, 6, 7 and 8 respectively. The arms of the bows 5, 6 and 7 at the opposite sides of the vehicle are pivoted to plates 9, the said plates being secured to the ends of a shaft 10 which is journaled transversely of the body beneath the rear seat 3, in openings 11 in the body, and the shaft is supported by ball bearings 12 at the inner sides of the openings 11.

The plates 9 are rigid with the shaft 10 and the shaft is provided with a radial arm 13 near one end, but within the body of the vehicle. The lower end of the shaft 13 is forked, and one end of a link 14 is received between the arms 15 of the fork. The link extends forwardly within the body, and the front end of the link is offset downwardly, as indicated at 14ᵃ, and is pivoted to a lever 16 intermediate the ends of the lever.

The lever 16 is pivoted to the body, as indicated at 17, at the lower end of the lever, and the said lever is provided with latch mechanism indicated at 18, for coöperating with a notched sector 19 secured to the body. The sector is provided with notches 20, for engagement by the latch mechanism to hold the lever in adjusted position.

Each arm of the rear bow 8 is provided with an angular extension 21 at its lower end, and the end of each extension remote from the bow is rigidly connected to the adjacent plate 9, as shown more particularly in Fig. 2. A bow is arranged between the front ends of the top and the bow 5, the said bow comprising a body 22, and arms 23. The arms 23 extend laterally from the body of the bow, and each arm is bent outward near its lower end, then again downward and the free end of each arm is provided with an eye 24.

A front bow comprising a body 25 and arms 26 is arranged in front of the bow 22—23. Each of the arms 26 extends downward and is then bent to extend rearwardly, as indicated at 27. Intermediate the ends of the portion 27 an eye 28 is provided, and the eye of each arm is engaged by the outward bent portion of the adjacent arm 23 of the bow 22—23.

Each of the portions 27 of the arms 23 extends rearwardly to a pivotal connection with the adjacent arm of the bow 5, as indicated at 29. Each of the said portions 27 of the arm 26 is provided with an angular extension 30 at its rear end, and each extension is adapted to lie alongside the adjacent arm of the bow 5, when the top is raised, and the free end of each extension is provided with a stop 31, in the form of an outwardly extending hook for engaging the adjacent arm of the bow 5, to limit the downward movement of the front end of the top.

The usual holding steadying straps 32 are provided, each strap being secured to the dash of the vehicle at one end, as indicated at 33, and having a snap hook 34 at its other end for engaging the eye 24 of the adjacent arm 23, of the bow 22—23.

In use, when the top is folded, it lies normally in the dotted line position of Fig. 1, the bows 5, 6, 7 and 8 lying one above the other, and with the flexible material of the top folded. When it is desired to raise the top, the lever 16 is released from the sector 19, and is swung rearwardly, as indicated in full lines in Fig. 1. This rearward swinging of the lever oscillates the shaft 10, and the plates 9, and the top is swung forwardly into extended position. The snap hooks 34 are engaged with the eyes 24, and the top is thus held extended. The lever 16 is held in rearward position and with the top extended, by the engagement of the latch mechanism with the rear notch (not shown) of the sector.

I claim:

1. The combination with the vehicle having an extension top, comprising a covering and bows, of a shaft journaled transversely of the body of the vehicle near the rear end thereof and having a radial arm, a lever pivoted to the front of the vehicle and having means for holding it in adjusted position, a link connecting the lever to the radial arm of the shaft, a plate rigidly secured to each end of the shaft outside the body, the rear bow of the top having at the lower end of each arm a rigid forward extension rigidly connected to the adjacent plate, the intermediate bows being pivoted to the plate, one of the front bows having eyes for engagement by holding means to hold the top extended and a hinged connection between the front bows and one of the rear bows for permitting the front bows to fold upon the rear bows.

2. The combination with the vehicle having an extension top, said top comprising a covering and bows for supporting the covering, each bow comprising a body and arms, of a shaft journaled transversely of the body of the vehicle near the rear end thereof, a plate rigidly secured to each end of the shaft outside of the body of the vehicle, the rear bow of the top having at the lower end of each arm a rigid forward extension rigidly connected to the adjacent plate, means connected with the shaft for oscillating the same to raise and lower the top, and a hinged connection between the front bows and one of the rear bows for permitting the front bows to fold upon the rear bows.

3. The combination with a vehicle having an extension top, said top comprising a covering, a series of rear bows, and a series of front bows, a plate at each side, the rearmost bow of the rear bows being rigidly connected with the plates, and the front bows of the rear bows being pivoted to the plates, a shaft rigidly connected with the plates and journaled in the vehicle body, means for oscillating the shaft, means for holding the shaft in adjusted position, said front bows being hinged to the rear bows, to fold upon the said rear bows, and means in connection with the front bows for engaging the rear bows to hold the front bows in extended position.

4. The combination with the vehicle having an extension top, said top comprising a covering and a series of bows, a plate at each side of the top, the rearmost bow being rigidly connected with the plates and the other bows being pivoted to the plates, a shaft connecting the plates and rigid therewith and journaled in the vehicle body, means for oscillating the shaft to raise or lower the top, releasable means for holding the shaft in adjusted position, said means comprising a lever pivoted to the vehicle body adjacent to one of the seats, a radial arm on the shaft, and a link connecting the lever to the arm.

LEWIS X JOHNSON.
his mark

Witnesses:
HENRY D. BIGGS,
R. L. PROPHIT, Jr.